US012738258B2

(12) United States Patent

Hersen et al.

(10) Patent No.: US 12,738,258 B2

(45) Date of Patent: Sep. 15, 2026

(54) METHODS AND SYSTEMS FOR MAINTAINING CONFIDENTIALITY OF VOCAL AUDIO

(71) Applicant: SKYTED, Toulouse (FR)

(72) Inventors: Stéphane Hersen, Toulouse (FR); Thibault Abily, Toulouse (FR)

(73) Assignee: SKYTED, Toulouse (FR)

( * ) Notice: Subject to any disclaimer, the term of this patent is extended or adjusted under 35 U.S.C. 154(b) by 221 days.

(21) Appl. No.: 18/730,512

(22) PCT Filed: Jan. 19, 2024

(86) PCT No.: PCT/EP2024/051296

§ 371 (c)(1),
(2) Date: Jul. 19, 2024

(87) PCT Pub. No.: WO2024/153805

PCT Pub. Date: Jul. 25, 2024

(65) Prior Publication Data

US 2026/0188295 A1 Jul. 2, 2026

(30) Foreign Application Priority Data

Jan. 20, 2023 (EP) .................................... 23305072

(51) Int. Cl.

*G10K 11/16* (2006.01)
*A41D 13/11* (2006.01)

(Continued)

(52) U.S. Cl.

CPC ........ *G10K 11/17827* (2018.01); *A41D 13/11* (2013.01)

(58) Field of Classification Search

CPC .......................... G10K 11/17827; A41D 13/11

(Continued)

(56) References Cited

U.S. PATENT DOCUMENTS 11,019,859 B1 6/2021 Rothenberg
11,295,759 B1 4/2022 Rothenberg (Continued)

FOREIGN PATENT DOCUMENTS

CN 215 531 841 U 1/2022

OTHER PUBLICATIONS

International Search Report Issued in Corresponding PCT Application No. PCT/EP2024/051296, dated Apr. 5, 2024. (3 Pages).

(Continued)

*Primary Examiner* — Ammar T Hamid

(74) *Attorney, Agent, or Firm* — Osha Bergman Watanabe & Burton LLP

(57) ABSTRACT

A system for maintaining confidentiality of vocal audio is provided. The system includes a shell defining an internal volume and configured for wearing on a face of a user, wherein the shell comprises a sound absorbing material, a first sound sensor configured to receive voice audio, a second sound sensor configured to receive at least attenuated voice audio, and a computing device. The computing device is configured to receive a selected confidentiality level, receive audio data from the first sound sensor and the second sound sensor, obtain an exit sound pressure level of the attenuated voice audio based on input from the second sound sensor obtain an ambient sound pressure level associated with ambient sound, determine a maximum desired distance of the attenuated voice audio based on the exit level and the ambient level, and provide a notification to the user that the selected confidentiality level cannot be assured.

29 Claims, 7 Drawing Sheets

(51) Int. Cl.
*G10K 11/178* (2006.01)
*H04R 3/02* (2006.01)

(58) Field of Classification Search
USPC ................................................ 381/71.1, 73.1
See application file for complete search history.

(56) References Cited

U.S. PATENT DOCUMENTS

| | | | |
|---|---|---|---|
| 2009/0060169 A1 | 3/2009 | Manne | |
| 2023/0010149 A1* | 1/2023 | Oren | H04R 1/345 |

OTHER PUBLICATIONS

Written Opinion of the International Searching Authority Issued in Corresponding PCT Application No. PCT/EP2024/051296, dated Apr. 5, 2024. (6 Pages).

* cited by examiner

METHODS AND SYSTEMS FOR MAINTAINING CONFIDENTIALITY OF VOCAL AUDIO

TECHNICAL FIELD OF THE INVENTION

The present disclosure relates to methods and systems for maintaining confidentiality of vocal audio. Particularly, the present disclosure relates to providing a user with controls for visualizing and adjusting an audible/intelligible distance of voice audio spoken by the user.

BACKGROUND OF THE INVENTION

As a result of various factors in the marketplace, the ability to conduct online meetings from virtually any location has become desirable. Travel and mobility are an important aspect of conducting business, and business travelers are often located in public spaces (e.g., airport waiting areas, airplane cabins, high-speed train cars, etc.

Topics discussed during online meetings are often confidential in nature, with subject matter that could be sensitive and even secret for one or more participants of the online meeting. Therefore, when a participant is located in a public space, the participant may need to leave the public space or forgo participation in the online meeting to prevent such subject matter from being publicly disclosed.

Further, certain participants who deem the subject matter of less importance may choose to participate in the meeting despite their presence in the public space without notifying other participants of the meeting. Therefore, sensitive and/or secret information may be shared publicly without the knowledge of other participants in the meeting.

U.S. Pat. No. 11,019,859 describes an acoustic facemask for reducing distortion and muffling of speech sounds by a facemask wall.

SUMMARY

The present inventor has recognized that there exists a desire to conduct substantially confidential communications within the confines of a public space where various actors may be present and thus, where a risk exists that the confidential subject matter could be improperly overheard.

Therefore, a system for maintaining confidentiality of vocal audio is provided. The system includes a shell defining an internal volume and configured for wearing on a face of a user with the internal volume surrounding a mouth of the user such that the shell does not contact the mouth, wherein the shell comprises a sound absorbing material, a first sound sensor associated with the internal volume and configured to receive voice audio, a second sound sensor associated with an external portion of the shell and configured to receive at least attenuated voice audio exiting the shell. The system includes a computing device configured to receive audio data from the first sound sensor and the second sound sensor, receive a selected confidentiality level from the user, the selected confidentiality level having a predetermine distance threshold, obtain an exit sound pressure level of the attenuated voice audio based on input from the second sound sensor, obtain an ambient sound pressure level associated with ambient sound, determine a maximum desired distance of the attenuated voice audio based on the exit sound pressure level and the ambient sound pressure level, and in response to determining that the maximum desired distance exceeds the predetermined distance threshold, provide a notification to the user that the selected confidentiality level of the voice audio cannot be assured.

By providing such a system it becomes possible to ensure that a user is aware of whether spoken information may remain confidential with a reasonable level of certainty. Because the user may be provided with a notification that the voice audio may be intelligible or even audible by others in a public space, the user may adjust a volume level of the voice audio to below a level at which others in the space may perceive the voice audio.

The computing device may be configured to interact wirelessly with at least one of the first sound sensor and the second sound sensor.

The computing device may further determine a difference between a sound pressure level of the voice audio and the attenuated voice audio, calculate a performance coefficient of the shell based on the difference, and provide an indication of the performance coefficient via the computing device.

In response to determining that the maximum desired distance exceeds the predetermined distance threshold, the computing device is configured to notify other users with whom the user is in communication via the computing device that confidentiality of the voice audio cannot be assured.

The system may further include an image capture device configured to obtain an image comprising one or more third parties, wherein the computing device may be configured to determine a zone of perceptibility based on the maximum desired distance, and provide an indication to the user, based on a position for each third party of the one or more third parties, a likelihood of the third party perceiving the attenuated voice audio.

The indication may include a color-coded heat map chart.

Based on a user selection, the computing device may be configured to output a reproduction of the voice audio.

The reproduction may include one or more of an audible reproduction and a visual reproduction.

The computing device may be configured to provide real-time visual guidance to the user for increasing and decreasing a sound pressure level of the voice audio based on the attenuated voice audio.

The system may further include a wireless headset configured to reproduce audio received from the computing device and to provide the notification.

The computing device may include one of a mobile telephone, a laptop computer, and a desktop computer.

The computing device may be further configured to: obtain, using the second sound sensor, ambient audio data at a time (T1) when the user is not speaking, the ambient audio data associated with the ambient sound; obtain, using the second sound sensor, mixed audio data at a time (T2) when the user is speaking, the mixed audio associated with the ambient sound and the attenuated voice audio; determine the exit sound pressure level based on the ambient audio data and the mixed audio data; and calculate the performance coefficient of the shell based on the sound pressure level of the voice audio and the exit sound pressure level. In this way, a technique to determine if the shell is being used correctly is provided.

T1 and T2 may be determined based on the audio data received by the first sound sensor.

The step to determine the exit sound pressure level based on the ambient audio data and the mixed audio data comprises: determine an ambient sound pressure level based on the ambient audio data; determine a mixed sound pressure level based on the mixed audio data; and determine the exit sound pressure level based on the ambient sound pressure level and the mixed sound pressure level.

The computing device may be further configured to separate the audio data received by the first sound sensor into a first ambient component and a first voice component; separate the audio data received by the second sound sensor into a second ambient component and a second voice component; determine a voice performance coefficient based on the first voice component and the second voice component; and determine an ambient performance coefficient based on the first ambient component and the second ambient component, wherein the performance coefficient is calculated further based on at least one of the voice performance coefficient and the ambient performance coefficient. In this way, a technique to determine if the shell is performing correctly in terms of voice attenuation and ambient noise attenuation is provided.

The steps to separate the separate the audio data received by the first sound sensor into a first ambient component and a first voice component and to separate the audio data received by the second sound sensor into a second ambient component and a second voice component comprises using a Wiener filter.

The computing device may be further configured to determine a voice-to-ambient performance coefficient based on the first voice component and the first ambient component; and provide an indication of the voice-to-ambient performance coefficient via the computing device.

The performance coefficient may be calculated further based on the voice-to-ambient performance coefficient.

The computing device may be further configured to obtain, using the second sound sensor, mixed audio data; and calculate a cross-correlation product between the audio data received by the first sound sensor and the audio data received by the second sound sensor; wherein the performance coefficient is calculated further based on the cross-correlation product. In this way, a technique to determine how ambient noise is contaminating a voice signal can be determined.

According to further embodiments, a method for maintaining confidentiality of vocal audio, is provided. The method includes receiving, by a computing device, audio data from a first sound sensor associated with a shell, the shell defining an internal volume and being configured for wearing on a face of a user with the internal volume surrounding a mouth of the user such that the shell does not contact the mouth, wherein the shell comprises a sound absorbing material, and a second sound sensor associated with an external portion of the shell and configured to receive at least attenuated voice audio exiting the shell, receiving a selected confidentiality level from the user, the selected confidentiality level having a predetermine distance threshold, obtaining an exit sound pressure level of the attenuated voice audio based on input from the second sound sensor, obtaining an ambient sound pressure level associated with ambient sound, determining a maximum desired distance of the attenuated voice audio based on the exit sound pressure level and the ambient sound pressure level, and in response to determining that the maximum desired distance exceeds the predetermined distance threshold, providing, by the computing device a notification to the user that the selected confidentiality level of the voice audio cannot be assured.

Implementing such a method enables a user to be aware of whether spoken information may remain confidential with a reasonable level of certainty. Because the user may be provided with a notification that the voice audio may be audible by others in a public space, the user may adjust a volume level of the voice audio to below a level at which others in the space may perceive the voice audio.

The method may further include providing real-time visual guidance to the user for increasing and decreasing a sound pressure level of the voice audio based on the attenuated voice audio.

The method may further include determining a difference between a sound pressure level of the voice audio and the attenuated voice audio, calculating a performance coefficient of the shell based on the determined difference, and providing an indication of the performance coefficient via the computing device.

The method may further include obtaining an image comprising one or more third parties in proximity to the user, determining a zone of perceptibility based on the maximum desired distance, and providing an indication to the user, based on a position for each third party of the one or more third parties, a likelihood of the third party perceiving the attenuated voice audio.

The method may further include obtaining, using the second sound sensor, ambient audio data at a time (T1) when the user is not speaking, the ambient audio data associated with the ambient sound; obtaining, using the second sound sensor, mixed audio data at a time (T2) when the user is speaking, the mixed audio associated with the ambient sound and the attenuated voice audio; determining the exit sound pressure level based on the ambient audio data and the mixed audio data; and calculating the performance coefficient of the shell based on the sound pressure level of the voice audio and the exit sound pressure level. In this way, a technique to determine if the shell is being used correctly is provided.

T1 and T2 may be determined based on the audio data received by the first sound sensor.

Determining the exit sound pressure level based on the ambient audio data and the mixed audio data may comprise: determining an ambient sound pressure level based on the ambient audio data; determine a mixed sound pressure level based on the mixed audio data; and determining the exit sound pressure level based on the ambient sound pressure level and the mixed sound pressure level.

The method may further comprise separating the audio data received by the first sound sensor into a first ambient component and a first voice component; separating the audio data received by the second sound sensor into a second ambient component and a second voice component; determining a voice performance coefficient based on the first voice component and the second voice component; and determining an ambient performance coefficient based on the first ambient component and the second ambient component, wherein the performance coefficient is calculated further based on at least one of the voice performance coefficient and the ambient performance coefficient. In this way, a technique to determine if the shell is performing correctly in terms of voice attenuation and ambient noise attenuation is provided.

Separating the audio data received by the first sound sensor into a first ambient component and a first voice component and separating the audio data received by the second sound sensor into a second ambient component and a second voice component may comprise using a Wiener filter.

The method may further comprise determining a voice-to-ambient performance coefficient based on the first voice component and the first ambient component; and providing an indication of the voice-to-ambient performance coefficient via the computing device.

The performance coefficient may be calculated further based on the voice-to-ambient performance coefficient.

The method may further comprise obtaining, using the second sound sensor, mixed audio data; and calculating a cross-correlation product between the audio data received by the first sound sensor and the audio data received by the second sound sensor; wherein the performance coefficient is calculated further based on the cross-correlation product. In this way, a technique to determine how ambient noise is contaminating a voice signal can be determined.

It is intended that combinations of the above-described elements and those within the specification may be made, except where otherwise contradictory.

It is to be understood that both the foregoing general description and the following detailed description are exemplary and explanatory only and are not restrictive of the disclosure, as claimed.

The accompanying drawings, which are incorporated in and constitute a part of this specification, illustrate embodiments of the disclosure and together with the description, serve to explain the principles thereof.

BRIEF DESCRIPTION OF DRAWINGS

Other advantages and features of the invention will become apparent on reading the description, illustrated by the following figures which represent.

DETAILED DESCRIPTION

Embodiments of the present disclosure are directed to aiding a user in maintaining confidentiality of voice audio emanating from the user. The systems and methods disclose herein implement a wearable shell configured to attenuate voice audio exiting the shell also referred to herein as "exit audio" and a computing device enabling a user to visualize a sound pressure level associated with vocal audio exiting the mask relative to ambient sound surrounding the user. The systems and methods enable a user to not only visualize whether spoken audio may be overheard by an undesired third party and to warn the user thereof, but to enable the user to adjust a level of audio spoken by the user to conform with a desired level of confidentiality. The systems and methods further provide an analysis tool to enable a user to visualize whether a particular third-party is within range for audibility or perceptibility of the audio exiting the mask.

Figure 1:
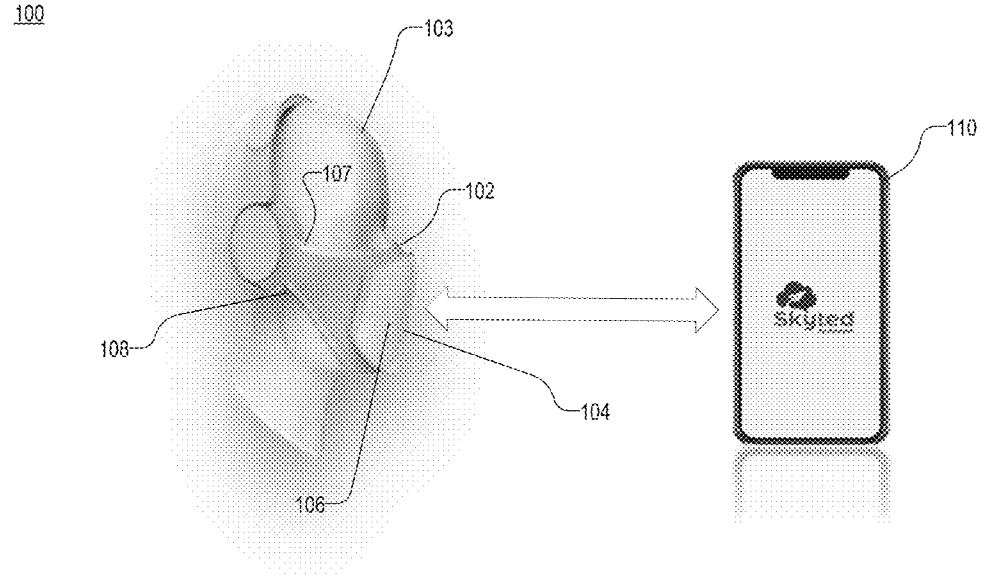
FIG. 1 shows components of an illustrative system for maintaining confidentiality of voice audio according to embodiments of the present disclosure.
Figure 2:
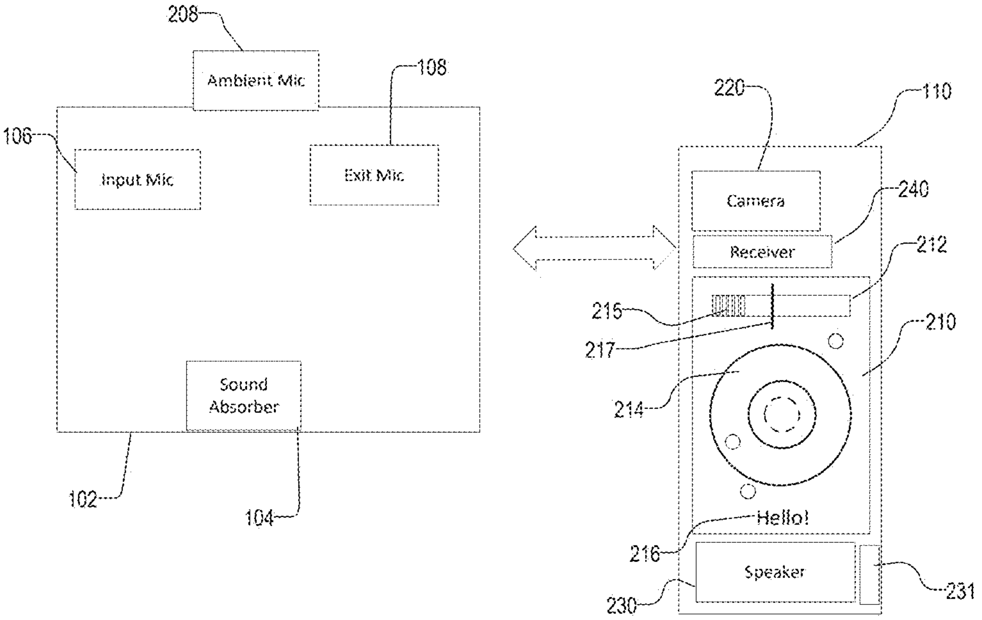
FIG. 2 shows a schematic representation of the system of FIG. 1.

FIG. 1 shows components of an illustrative system 100 for maintaining confidentiality of voice audio according to embodiments of the present disclosure, while FIG. 2 shows a schematic representation of the system of FIG. 1. These drawings will be referenced interchangeably in the following description.

The system 100 includes a shell 102, also referred to herein as a "mask," configured for wearing on the face of a user 103 and a computing device 110. The shell 102 may present a shape configured to conform with the face of a user 103 and may define an internal volume configured to surround the mouth of the user 103 without contacting the mouth of the user 103. For example, the shell 102 may be cupped for domed such that an interior surface of the shell 102 is positioned away from the mouth of the user 103, while edges of the shell 102 may rest on the cheeks or other facial parts of the user 103.

The shell 102 may be fabricated from any suitable material enabling comfort and form fit for the. For example, the mask may be fabricated from a metamaterial, a filter material, or any suitable sound absorber.

The shell 102 may include one or more features enabling the mask to be secured to the user 103. For example, the shell 102 may include one or more straps configured to pass over the ears of the user 103 and configured to be tightened to hold the shell 102 on the face of the user. According to another example, the mask 102 may be configured to attach in a removable manner with a headset 109, described below, for example via detachable clips (e.g., magnetic clips).

According to embodiments of the present disclosure, the shell 102 includes a sound absorber 104 configured to reduce (i.e., attenuate) a sound pressure level (SPL) of voice audio. For example, the sound absorber 104 may be fabricated from a metamaterial, a filter material, or any suitable sound absorber. The materials provided herein is intended as illustrative only and not as limiting, any known sound absorbing material may be implemented for purposes of attenuating voice audio within the shell 102.

The sound absorber 104 may be positioned at any suitable location relative to the shell 102. For example, the sound absorber 104 may be positioned within the interior volume of the shell 102 and/or on an external portion of the shell 102.

The sound absorber 104 may have any suitable geometry relative to the shell 102 for purposes of attenuating voice audio spoken by the user 103 within the internal volume of the shell 102. For example, the sound absorber 104 may cover an interior portion of the shell 102 entirely. According to another example, the shell may be formed entirely from the sound absorber. In yet another example, a plurality of pieces of sound absorber 104 may be adhered to the internal volume of the shell 102 at certain locations with the intention of maximizing the sound attenuating effects of the sound absorber 104.

The shell 102 and sound absorber 104 may be configured to redirect air and therefore, sound energy from a front portion of the shell 102 to a rear, exit zone 107 of the shell 102. For example, the interior volume of the shell 102 may include channels and/or flow paths (not shown) configured to redirect air and therefore sound waves through the shell 102 to an exit zone 107.

The shell 102 may include a first sound sensor 106 configured to receive voice audio from the user 103. For example, the sound sensor 106 may be positioned within the internal volume of the shell 102 at a position configured to maximize captured voice audio from the user 103. According to such an example, the first sound sensor 106 may be adhered to a wall defining the internal volume of the shell at a position directly in front of the mouth of the user when the shell 102 is in a worn position on the user 103. When referring to the "worn position" of the shell 102 it is intended to refer to the shell positioned such that the internal volume of the shell 102 covers the mouth of the user 103, as shown at FIG. 1. In other words, the shell 102 may be held temporarily in the worn position and/or fixed in the worn position (e.g., via straps) for longer periods.

The sound sensor 106 may comprise any suitable device(s) for capturing voice audio from the user 103 and transmitting an electrical representation of the captured voice audio to the computing device 110. For example, the sound sensor 106 may comprise one or more audio microphones having a frequency response, sensitivity, and capture pattern desirable for voice audio within an enclosed space (e.g., the internal volume of the shell 102). Illustrative microphone types according to embodiments of the present disclosure include, for example, aerial, bone conduction, cartilage conduction, and skin conduction, among others. One of skill will recognize that this list is not exhaustive, and that any suitable sound sensor may be implemented.

According to further embodiments, the sound sensor 106 may comprise a bone conduction microphone configured to capture sound waves from bones of a user, e.g., a user's jaw and/or ear structure. According to such an embodiment two or more sound sensors 106 may be implemented one on each side of the user's face 103, e.g., at a position where the shell 102 meets the headset 109 show at FIG. 1.

The sound sensor(s) 106 may be configured to transmit signals representing the captured sounds (e.g., voice audio) via any suitable transmission method. For example, the sound sensor 106 may be configured to wirelessly transmit the captured voice audio to the computing device 110 using any suitable wireless transmission protocol (e.g., Bluetooth, IEEE 802.11, 3G/4G/5G, etc.) Alternatively, or in addition, the sound sensor 106 may include a wired connection to a transmitter (not shown) installed in or on the shell 102. The transmitter may be configured to transmit the captured sound signals to the computing device 110.

The shell 102 includes a second sound sensor 108 associated with an external portion of the shell 102 and configured to receive at least attenuated voice audio exiting the shell 102. The second sound sensor 108 may be any suitable device for capturing sound attenuated by the shell 102 and/or sound absorber 104. For example, the second sound sensor 108 may comprise a microphone having a frequency response, sensitivity, and capture pattern desirable for capturing attenuated voice audio exiting the shell 102 at an exit zone 107. Illustrative microphone types according to embodiments of the present disclosure include, for example, aerial, bone conduction, cartilage conduction, and skin conduction, among others. One of skill will recognize that this list is not exhaustive, and that any suitable sound sensor may be implemented.

The second sound sensor 108 may be positioned at an exterior (i.e., outside of the interior volume) and on an edge portion of the shell 102 near the exit zone 107. For example, the second sound sensor 108 may be positioned on the shell 102 and near an ear of the user 103 when the shell 102 is in the worn position. This may enable the second sound sensor 108 to obtain a more accurate measurement of a SPL of attenuated voice audio exiting the shell 102.

According to some embodiments, two or more second sound sensors 108 may be provided on an exterior of the shell 102 to permit more accurate determination of SPLs of attenuated voice audio exiting the shell 102. For example, a sound sensor 108 may be positioned on each side of the face of the user 103 at the exit zones 107 of the shell 102.

The second sound sensor(s) 108 may be configured to transmit signals representing the captured sounds (e.g., attenuated voice audio) via any suitable transmission method. For example, a second sound sensor 108 may be configured to wirelessly transmit the captured audio to the computing device 110 using any suitable wireless transmission protocol (e.g., Bluetooth, WiFi (e.g., IEEE 802.11), 3G/4G/5G, etc.) Alternatively, or in addition, the second sound sensor 108 may include a wired connection to a transmitter (not shown) installed in or on the shell 102. The transmitter may be configured to transmit the captured sound signals to the computing device 110.

Based on the voice audio captured by the first sound sensor 106 and the attenuated voice audio captured by the second sound sensor 108, it may be possible to calculate a difference in SPL between these two audio signals. The difference between the two audio signals resulting from the attenuation occurring within the internal volume of the shell 102 may be expressed as a percentage of the SPL of the initial voice audio signal captured by the first sound sensor 106 and may correspond to a performance coefficient of the shell. The performance coefficient may be provided to a user 103 as an indication (e.g., on a display 210) to enable to user 103 to determine, for example, whether the shell 102 has been properly equipped on the face of the user 103 and/or whether the shell 102 or sound absorber 104 is faulty.

According to embodiments of the disclosure, features of the system 100 are also configured to obtain information enabling determination of ambient SPLs surrounding the user 103 and the shell 102. For example, the second sound sensor 108 may receive sound information from the surroundings and provide the information to the computing device 110 via the wired/wireless connection provided for the second sound sensor 108. Alternatively, or in addition, an ambient sound sensor 208 may be provided on the shell 102 and configured to obtain ambient sound information. The ambient sound sensor 208 may be similar and provide similar functionality (e.g., wireless signal transmission, etc.) to the sound sensor(s) 106 and second sound sensors 108.

The headset 109 may be configured to be worn on and/or in the ears of the user 103 and to provide audio information to the user 103. For example, the headset 109 may comprise one or more sound transducers (e.g., speakers) configured to deliver sound to the ears of the user 103. The headset 109 may receive signals related to the sound information via a wired and/or wireless connection (e.g., to the computing device 110). Wireless connectivity of the headset 109 may be achieved similarly to the sound sensors 106 and 108, and amplification provided via known techniques.

The headset 109 may be any suitable device for providing sound information to the user 103. For example, the headset 109 may include in-ear, over-ear, on-ear, headphones or any other suitable configuration for conveying sound to the user 103.

The sound sensor 106, sound sensor 108, and headset 109, may each be configured for "pairing" with the computing device 110. For example, where a Bluetooth connection between the computing device and the sound sensors 106 and 108, and/or the headset 109 is implemented, pairing may be performed via known techniques in the art. The pairing may automatically cause the computing device 110 to begin performing operations according to the present disclosure.

The computing device 110 is configured to perform functions associated with embodiments of the present disclosure and may comprise any suitable device for carrying out such functions. The computing device 110 may include, for example, a display 210, an image capture device 220 (e.g., a camera), an audio output device 230 (e.g., a loudspeaker), a receiver 240, etc.

The illustrated computing device 110 is intended to encompass any computing device such as a server, desktop computer, laptop/notebook computer, wireless data port, smart phone, personal data assistant (PDA), tablet computing device, one or more processors within these devices, or any other suitable processing device, including both physical or virtual instances (or both) of the computing device. Particularly, the computing device 110 includes hardware enabling a user 103 to conduct wireless communications using over the air signals to transmit and receive data to and from one or more sources. In the context of the present disclosure, the term "communications" shall refer to any of placing and receiving telephone calls, online conferencing (e.g., video calls, Facetime, Zoom, MS Teams), virtual meetings, texting, and any other type of conveying information to a remotely located party. Because such computing devices are known in the art, an in-depth description of all features of such devices will not be undertaken, however, certain additional components of the computing device 110 are described below.

The display 210 may comprise any suitable device for providing visual information to a user 103. For example, the display 210 may include an LED, an OLED, an LCD, or other suitable display type. The display 210 may be configured to act as an interface between the user 103 and the computing device 110 and may provide information to and receive information from the user 103. For example, the display may be configured to display text 216, graphic information 214 (e.g., a heat map), and a SPL indicator 212, providing feedback to the user 103 or other parties in and around the computing device 110, among other things. Such information will be discussed in greater detail below.

In addition, the display 210 may be configured as a touchscreen to receive input via touch from the user. For example, a capacitive touch LED or OLED screen may be implemented as display 210. The display 210 is not intended to be limited to a touchscreen type device, and input may be received via other input devices that are external to the computing device 110.

The text information 216 on the display 210 may be configured to provide various information to a user 103 operating the computing device 110 in the context of embodiments of the present disclosure. For example, the text information may be configured to provide a notification regarding a desired confidentiality level and whether the current conditions meet the desired level. For example, when it is determined, as described below, that the desired level of confidentiality is not being met, the text information 216 may provide a warning (e.g., a flashing phrase) that the user 103 needs to speak more quietly.

Further, the text information 216 may be configured to provide a visual reproduction of words received by the computing device 110 via a voice audio spoken by the user 103, captured by the sound sensor 106, and sent to the computing device. For example, the computing device 110 may include voice recognition software trained for the user 103 such that words spoken by the user may be "recognized" (i.e., speech recognition) and displayed on the display 210 upon receiving a selection from the user indicating a desire to display the text. This feature may be helpful when the user 103 is wearing the shell 102 on the face, thereby attenuating voice audio, but would like to speak with someone nearby (e.g., a taxi driver, a flight attendant, etc.)

The SPL indicator 212 may be configured to provide real-time visual guidance to the user for increasing and decreasing a SPL of the voice audio based on the attenuated voice audio. For example, the SPL indicator 212 may indicate a current SPL of the user's voice audio via SPL meter 215 relative to an indicator 217 showing a maximum level for voice audio while still maintaining confidentiality.

The graphic information 214 display may be configured to provide a user 103 with a graphical representation of, for example, a size of confidentiality zones for selectable confidentiality levels, positions of third parties within such zones, etc. For example, a heat map-type display (see, e.g., element 490 of FIG. 4B) may be provided showing circular zones surrounding the user, with various colors used to indicate the risk of vocal audio being overheard within each of the zones and relative to the third parties.

The audio output device 230 may be any suitable device configured to provide audio output to the user 103. For example, the audio output device 230 may comprise a loudspeaker, a headphone jack, etc. The audio output device 230 may further be configured to provide an wireless signal representing the audio output to one or more wireless devices configured to convert and amplify the audio output (e.g., Bluetooth speakers, headphones, etc.) This feature may be useful for enabling a user to amplify and/or reproduce on demand (e.g., via a user selection on the computing device 110), the voice audio attenuated by the shell 102. For example, when the user 103 is wearing the shell 102 but would like to communicate with someone in close proximity (e.g., a taxi driver, restaurant staff, etc.)

The receiver 240 is configured to receive audio data from the sound sensor 106 and the second sound sensor 108, among other things. For example, the receiver 240 may include one or more of Bluetooth, WiFi (e.g., IEEE 802.11), cellular, etc., receivers configured to wirelessly receive an electronic signal representing audio data (e.g., voice audio and attenuated voice audio) from the sound sensors 106 and 108, among other sensors (e.g., an ambient sound sensor). The receiver 240 may be configured to provide the signal to a processor 516 of the computing device 110 via any suitable means, e.g., via a system bus 503 of the computing device 110.

The image capture device 220 may be configured to obtain one or more images comprising one or more third parties in proximity to the user 103. For example, the image capture device 220 may comprise a camera (e.g., a front or rear camera of a cell phone) that may form part of the computing device 110. Alternatively, or in addition, the image capture device 220 may be an external camera configured to communicate, either by wire or wirelessly, with the computing device 110 to enable the computing device 110 to obtain an image of the surroundings of the user 103.

Images captured by the image capture device 220 may be used by the computing device to determine and show a zone of perceptibility. For example, a user 103 may photograph a third party positioned in proximity to the user 103. The computing device 110 may determine a distance to the third party and then, based on a maximum desired distance determined as described below, the computing device 110 may provide an indication of a likelihood of the third party perceiving attenuated voice audio exiting the shell 102. As used herein, the term "maximum desired distance" may refer to a maximum distance at which exit audio can be heard by a third-party listener. This may also be referred to as a maximum distance at which the exit audio can be perceived. Alternatively, depending on a desired implementation, the maximum desired distance may refer to the maximum distance at which exit audio may be intelligible, i.e., at which spoken words may be understood by a third-party listener. Either of the two definitions fall within the scope of the present application.

The computing device 110 may include a sound sensor 231 configured to receive various sounds, such as, for example, voice audio from the user, voice audio from a third-party, ambient sounds, etc. The sound sensor 231 may correspond to a microphone installed in the computing device 110 and/or an external microphone connected to the computing device either via wired connection (e.g., USB, serial cable, etc.) or a wireless connection (e.g., Bluetooth, Wi-Fi (e.g., IEEE 802.11), etc.).

Figure 3:
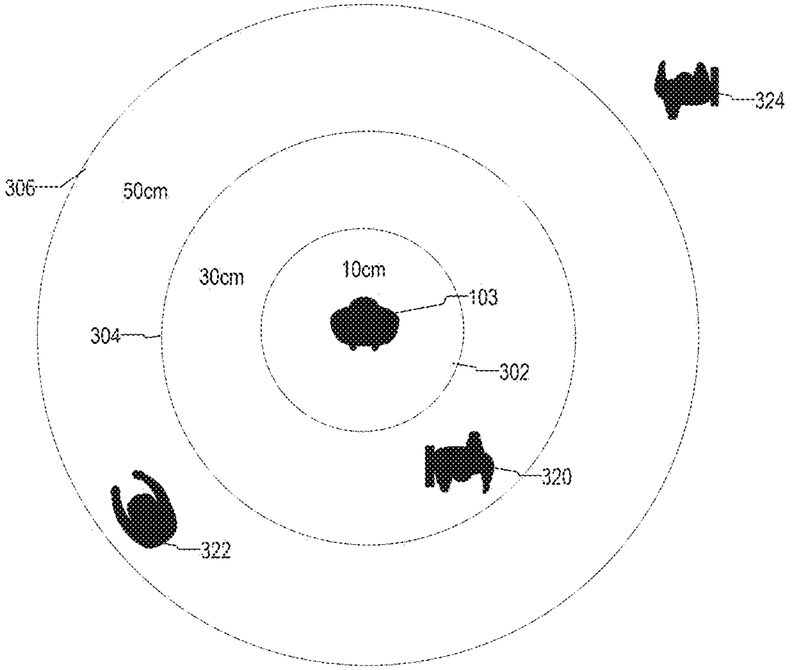
FIG. 3 shows an illustrative schematic of a hypothetical situation in which confidentiality is desired in a public space.

FIG. 3 shows an illustrative schematic of a hypothetical situation in which confidentiality is desired in a public space.

Embodiments of the present disclosure implement a concept of SPL differential between a SPL of spoken voice audio, SPL of attenuated voice audio leaving the shell 102, and detected SPL of ambient sounds surrounding the shell 102. Because the voice audio exiting the shell 102 has been attenuated by the sound absorber 104 and the shell 102 itself, and because the ambient sound surrounding the shell 102 will mask the attenuated audio exiting the shell 102, it becomes possible to determine a maximum distance $Dmax_{audible}$ at which the attenuated audio may be audible, intelligible, or perceptible to a third party 320, 322, 324. Based on a level of confidentiality (e.g., high, medium, low) selected by a user 103, a distance threshold associated with the selected level of confidentiality may be applied and the user 103 may be provided with feedback enabling the user to adjust SPL of voice audio so as not to exceed the distance threshold of the selected level of confidentiality.

Turning to FIG. 3, each of the indicated rings 302, 304, 306 may be considered to correspond to a different level of confidentiality selectable by the user 103 on the computing device 110. For example, the first ring 302 may correspond to a high level of confidentiality where attenuated voice audio exiting the shell 102 is only audible or perceptible within the area delineated by the first ring 302. In the example shown at FIG. 3, only the user 103 would fall within the maximum desired distance threshold for the high confidentiality setting.

The second ring 304 may correspond to a medium level of confidentiality, while the third ring 306 may correspond to a low level of confidentiality, as selected by the user 103 on the computing device 110. Thus, in the case where the user 103 selected a medium level of confidentiality, the third party 320 and the user 103 would fall within the maximum desired distance. Similarly, in the case of a selection of low confidentiality, the third ring 306 may correspond to the maximum desired distance, and each of the user 103, the third party 320, and the third party 322 would fall within the maximum desired distance. The third party 324 would not fall within the maximum desired distance for any of the selected confidentiality levels, and may correspond to a distance at which the user 103 would be unable to communicate with the third party 324 while wearing the shell 102 unless the third party 324 were also participating in a confidential conversation.

Based on the above, a formula for calculating the SPL (d2) at a distance d2, e.g., a location of a third party, with a known SPL (d1) at a distance d1, i.e., at the exist of the shell 102 is expressed at equation (1.

$$L(d2) = L(d1) - 20\log(d2/d1) \qquad (1$$

The inverse of formula (1, which enables calculation of an initial sound level L (d1) at a distance d1 when we know the sound level L (d2) at a distance d2, is shown at equation (2.

$$L(d1) = L(d2) + 20\log(d2/d1) \qquad (2$$

The formula for calculating the distance d2 with a known SPL (d1) at the distance d1, and a SPL (d2) at the distance d2 is shown at equation (3.

$$d2 = 10(L(d1) - L(d2) + 20\log(d1))/20 \qquad (3$$

The following example is provided for aiding in understanding the described calculations. Assuming a user's voice at 20 cm (i.e., within the personal space of the user) is 80 dB, we can estimate the SPL of the voice at 3 meters as follows:

L(3)=80-20 log(3/0.2)

L(3)=56.5 dB

Next, the distance at which the user's voice will reach 50 dB when the user continues to speak at 80 dB at 0.2 m can be determined.

d2=10 (80-50+20 log(0.2))/20 d2=6.32 m

Thus, the user's voice will then have reached 50 dB at 6.32 m.

Considering the ambient SPL to be location and time dependent, for example, a cabin of an aircraft may have an ambient sound level of 75 dB during level flight, 85 dB during takeoff, and 70 dB during landing, embodiments of the present disclosure may be configured to implement one or more intelligibility signal-to-noise ratios (SNR) curves for determining a dynamic threshold. Studies have been performed to determined intelligibility and illustrative graphs plotting intelligibility for given SNR are available from various sources. For example, DPA Microphones of Longmont, Colorado, USA, (https://www.dpamicrophones.com/) have undertaken and published various studies on intelligibility as a function of SNR. For purposes of example, taking an ambient sound level of 75 dB, corresponding to noise of the SNR, it may be determined that intelligibility is lost when the SPL of the voice audio (corresponding to the signal) at d2 (in this example, 6.3 m) equals 80% of a determined ambient SPL and the computing device may continuously adapt a threshold as the ambient SPL changes.

Alternatively, according to some embodiments, a fixed value of −10 dB SNR may be implemented based on a determined exit audio SPL as compared to ambient noise. Such a fixed decrease in SPL may be sufficient to nullify intelligibility in most situation, and therefore, maintaining a constant −10 to −15 SNR below the ambient noise can reduce computational power thereby increasing efficiency.

Figure 4A:
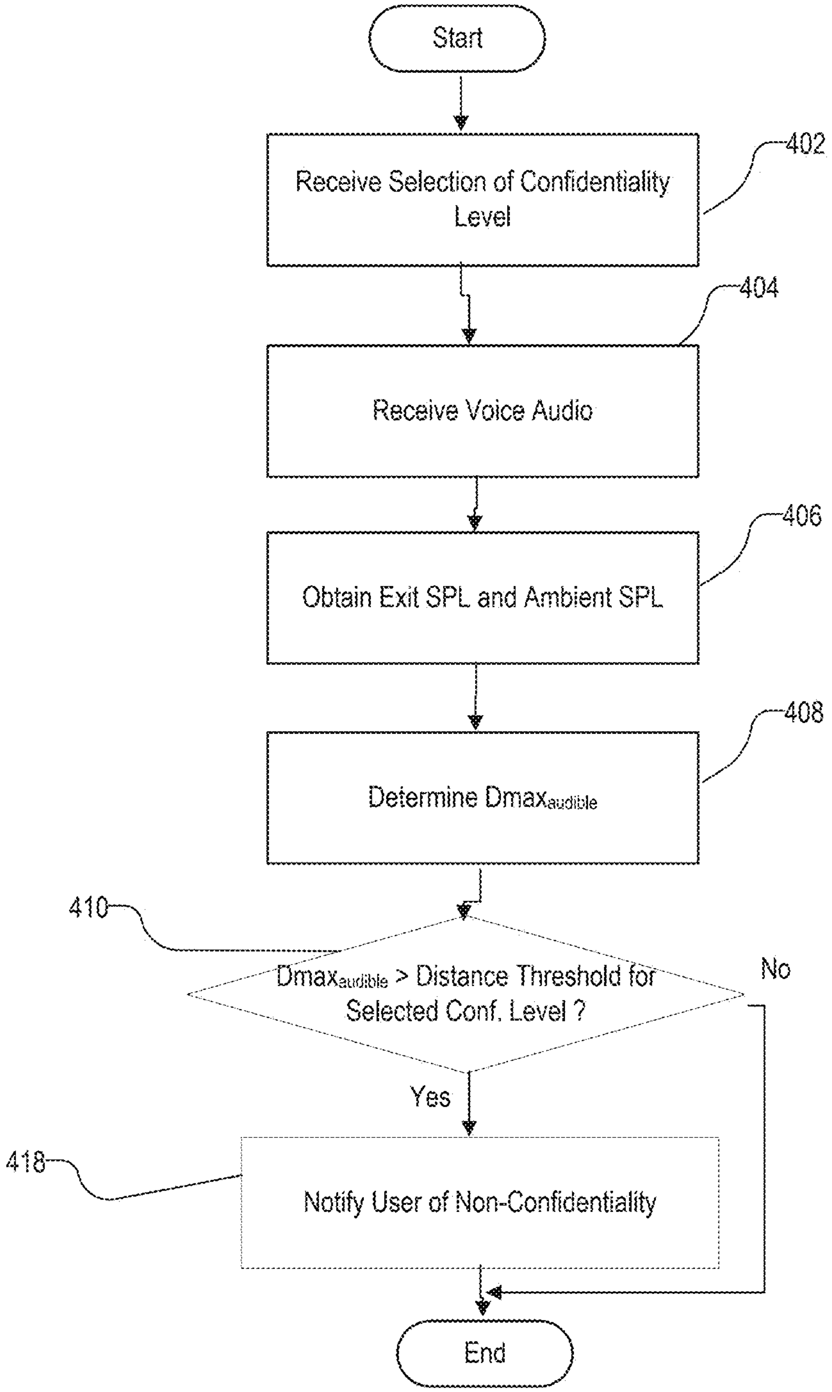
FIG. 4A is a flowchart highlighting a method for maintaining confidentiality of voice audio according to embodiments of the present disclosure.

FIG. 4 is a flowchart highlighting a method for maintaining confidentiality of voice audio according to embodiments of the present disclosure. FIGS. 2 and 3 will be referred to in conjunction with FIG. 4 to facilitate description of the illustrative method.

Figure 4B:
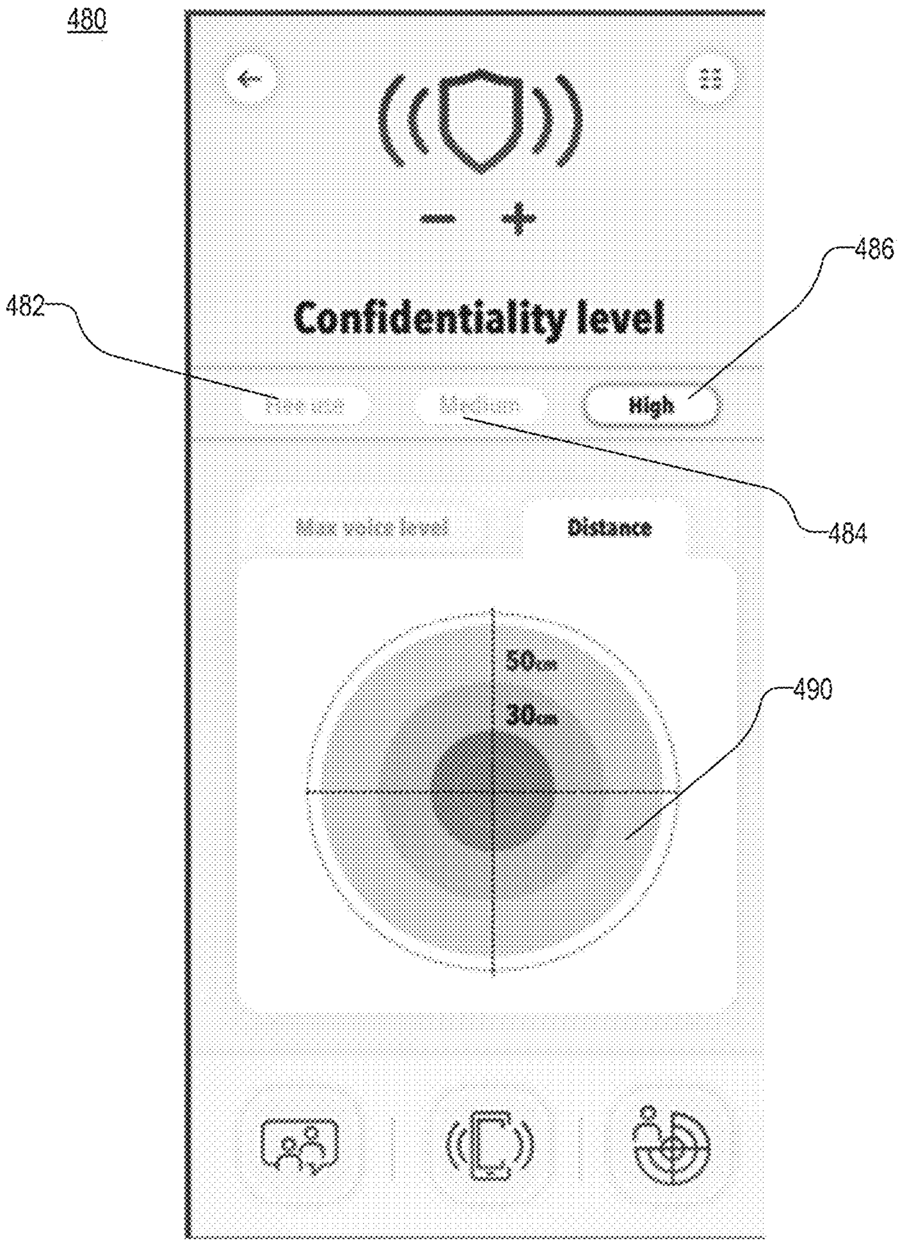
FIGS. 4B-C are illustrative interfaces that may be implemented in the context of embodiments of the present disclosure.

The user 103 may select a level of confidentiality desired for a current location of the user 103 (step 402). For example, upon pairing of one or more of the sound sensors 106 and 108, the user 103 may be presented with an option interface 480 as shown at FIG. 4B displayed on a display (e.g., display 210). Such an interface may present a selection of options via a selection interface including, for example, buttons 482, 484, 486. Each of the selections may correspond to a desired confidentiality level (e.g., low, medium, high), for example. The use of buttons in the interface 480 is not intended as limiting, and other selectors, e.g., a dropdown box, radio buttons, etc. may be implemented as desired.

In addition to the selections for confidentiality, the interface 480 may provide additional information related to confidentiality to the user 103. For example, an indication of a threshold distance for a particular confidentiality level may be represented in a chart 490 within the interface 480. Similar to the discussion regarding FIG. 3 above, each ring in the chart may indicate a threshold distance from a center ring (i.e., user position) corresponding to each defined and selectable confidentiality level.

According to some embodiments, the user 103 may set a desired level of confidentiality as a default setting in the computing device 110, such that upon initiation and/or pairing of the sound sensors 106 and 108, the default confidentiality setting is automatically selected. The user may then subsequently change the confidentiality level as desired. The user 103 may then be permitted to change the default level of confidentiality as desired via the interface 480.

Once a confidentiality level has been selected by the user 103, the user 103 may begin to speak within the shell 102 such that sound sensor 106 receives voice audio from the user 103 and the second sound sensor 108 receives attenuated audio of the voice audio exiting the shell 102. The voice audio spoken and obtained by the sound sensor 106 may be received by the computing device as a voice audio signal (step 404). For example, the sound sensor 102 may provide the voice audio to the computer via a wireless connection (e.g., Bluetooth).

The computing device 110 may then obtain an exit audio SPL for the attenuated voice audio received by the sound sensor 108 as well as determining an ambient SPL for the sounds surrounding the user 103 (step 406). For example, the second sound sensor 108 may obtain an attenuated audio signal of the voice audio at the exit of the shell 102 and may determine from the signal a corresponding SPL. The computing device 110 may further receive ambient sound surrounding the user 103 for purposes of obtaining an SPL of the ambient sound. For example, the sound sensor 231 may obtain a sound signal corresponding to ambient sound in the vicinity of the computing device 110 and this signal used to determine an SPL of the ambient sound. Alternatively, or in addition, any other suitable sound sensor (e.g., second sound sensor 108) may provide an ambient sound signal to the computing device 110 to enable the computing device 110 to determine an SPL associated with the ambient sound.

Based on the exit audio SPL and the ambient SPL obtained at step 406 the computing device may determine a maximum desired distance Dmax from the user 103 at which the attenuated voice audio can be heard (step 404). This determination may be made using the equations and techniques noted above The determined maximum desired distance Dmax may then be compared to the threshold distance corresponding to a selected confidentiality level (step 410), and provided the maximum desired distance Dmax does not exceed the threshold distance for the selected confidentiality level (step 410: no), no further action is taken.

When it is determined that the maximum desired distance Dmax exceeds or is equal to the threshold distance for the selected confidentiality level (step 410: yes), a notification is provided to the user indicating the confidentiality is not assured (step 418). For example, an audible notification may be provided to the user 103 via the headset 109 and/or via the speaker 230 of computing device 110. Alternatively, or in addition, the interface 480 may provide the notification to the user 103 via text or other suitable method (e.g., flashing lights, etc.)

According to some embodiments, when it is determined that the confidentiality is not assured, the computing device 110 may be configured to send a notification to participants of communications with the user 103 (e.g., via an API of the application performing the communication). For example, when a user is conducting a virtual meeting with participants on the computing device 110, the computing device may cause a warning (e.g., a flashing notification) to be broadcast to the other devices participating in the virtual meeting. Thus, the other participants may understand that no confidential information should be discussed while the notification is being displayed on their device. The participants may also notify the user 103, for example, where the user 103 has not acknowledged that the desired confidentiality level cannot be met.

Figure 4C:
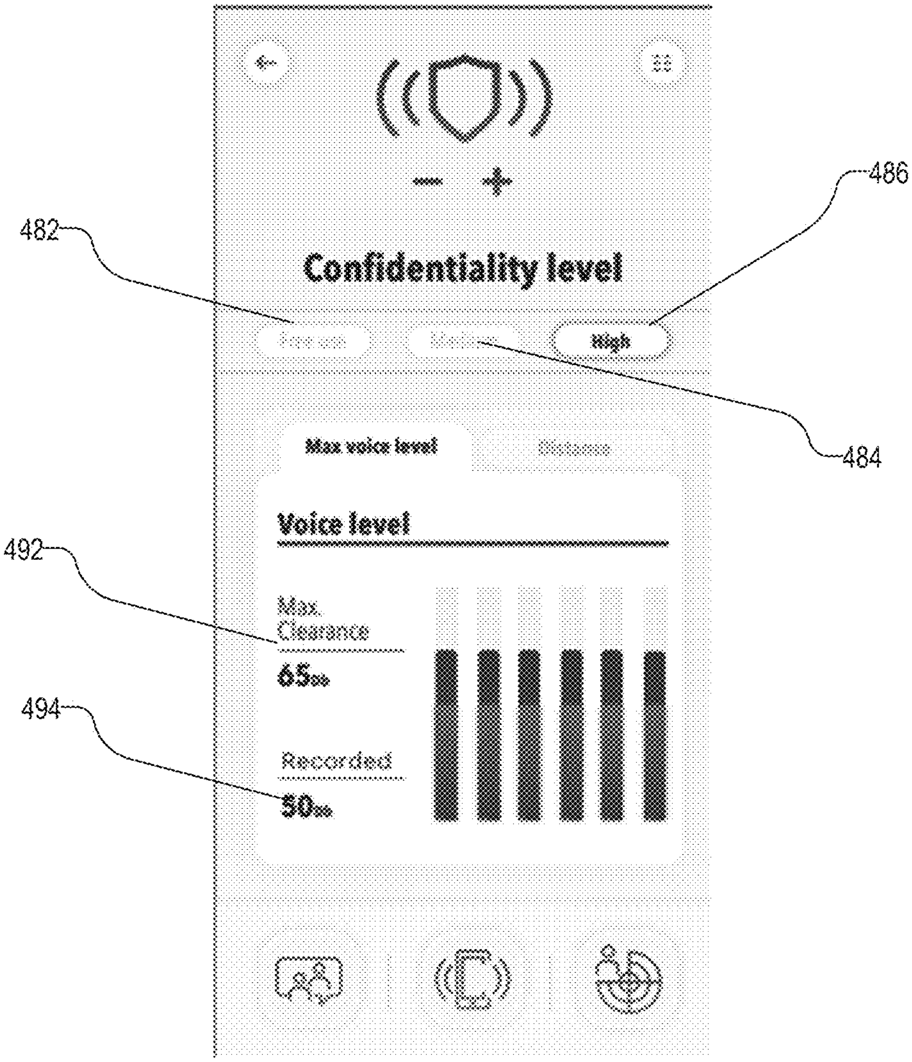

According to still further embodiments, and as shown at FIG. 4C, the computing device 110 may provide an indication to the user of the maximum level for the voice audio spoken by the user to maintain confidentiality, while also displaying the maximum detected level of the voice audio. As shown at FIG. 4C, a maximum SPL of audio 492 spoken by the user should not exceed 65 dB in order to maintain the desired level of confidentiality. Over the course of a communication (e.g., during a virtual meeting), the user 103 is informed that the maximum detected voice audio SPL 494 spoken by the user is 50 dB. Therefore, the user 103 can be reasonably certain the entire communication has remained within the level for the desired level of confidentiality.

According to still further embodiments, during a conference call a call organizer may monitor at any time or even continuously that all participants in the conference call have exit audio levels remaining below the maximum threshold to avoid possible breaches of confidentiality. For example, the call organizer may be provided with an indication of exit audio levels for all of the participants, and this may be compared to a threshold set in the security and confidentiality configuration for the call. When a participant exceeds the threshold, the offending participant may be cut off from the call (e.g., muted, sound feed terminated, etc.) for a set period of time or until the participant falls back below the threshold. Thus, unauthorized recording of conversations by third parties can be limited or prevented.

Figure 5:
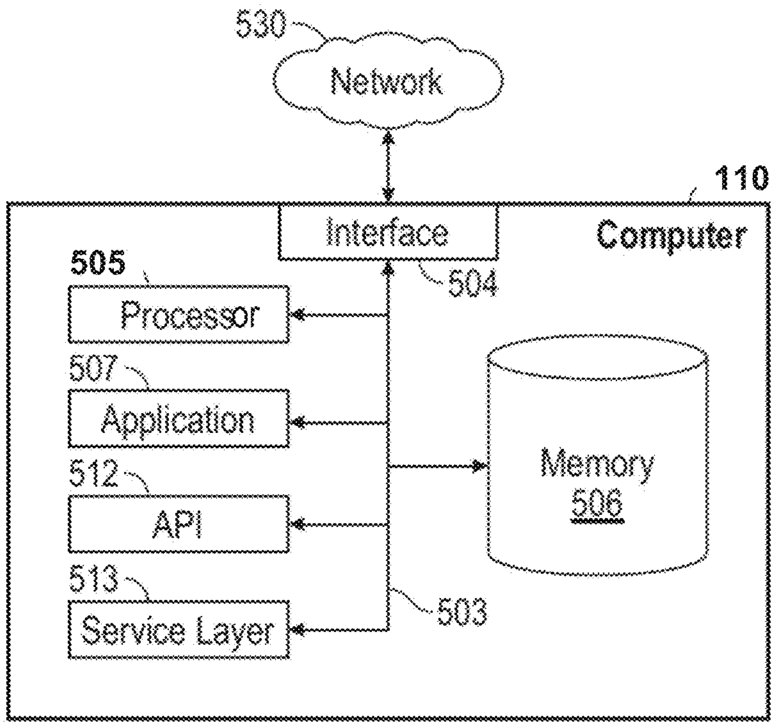
FIG. 5 shows an illustrative computing device 110 that may be implemented in accordance with one or more embodiments of the present disclosure.

FIG. 5 shows an illustrative computing device 110 that may be implemented in accordance with one or more embodiments of the present disclosure. Specifically, FIG. 5 shows a block diagram of a computing device 110 system used to provide computational functionalities associated with described algorithms, methods, functions, processes, flows, and procedures as described in the instant disclosure, according to an implementation.

The computing device 110 may include a computer that includes an input device, such as a keypad, keyboard, touch screen, or other device that can accept user information, and an output device that conveys information associated with the operation of the computing device 110, including digital data, visual, or audio information 104, 106 (or a combination of information), or a GUI.

The computing device 110 can serve in a role as a client, network component, a server, a database or other persistency, or any other component (or a combination of roles) of a computer system for performing the subject matter described in the instant disclosure. The illustrated computing device 110 is communicably coupled with a network 530. In some implementations, one or more components of the computing device 110 may be configured to operate within environments, including cloud-computing-based, local, global, or other environment (or a combination of environments).

At a high level, the computing device 110 is an electronic computing device operable to receive, transmit, process, store, or manage data and information associated with the described subject matter. According to some implementations, the computing device 110 may also include or be communicably coupled with an application server, e-mail server, web server, caching server, streaming data server, business intelligence (BI) server, or other server (or a combination of servers).

The computing device 110 can receive requests over network 530 from a client application (for example, executing on another computing device 110) and responding to the received requests by processing the said requests in an appropriate software application. In addition, requests may also be sent to the computing device 110 from internal users (for example, from a command console or by other appropriate access method), external or third-parties, other automated applications, as well as any other appropriate entities, individuals, systems, or computers.

Each of the components of the computing device 110 can communicate using a system bus 503. In some implementations, any or all of the components of the computing device 110, both hardware or software (or a combination of hardware and software), may interface with each other or the interface 504 (or a combination of both) over the system bus 503 using an application programming interface (API) 512 or a service layer 513 (or a combination of the API 512 and service layer 513.

The API 512 may include specifications for routines, data structures, and object classes. The API 512 may be either computer-language independent or dependent and refer to a complete interface, a single function, or even a set of APIs. The service layer 513 provides software services to the computing device 110 or other components (whether or not illustrated) that are communicably coupled to the computing device 110.

The functionality of the computing device 110 may be accessible for all service consumers using this service layer. Software services, such as those provided by the service layer 513, provide reusable, defined business functionalities through a defined interface. For example, the interface may be software written in JAVA, C++, or other suitable language providing data in extensible markup language (XML) format or other suitable format.

While illustrated as an integrated component of the computing device 110, alternative implementations may illustrate the API 512 or the service layer 513 as stand-alone components in relation to other components of the computing device 110 or other components (whether or not illustrated) that are communicably coupled to the computing device 110. Moreover, any or all parts of the API 512 or the service layer 513 may be implemented as child or sub-modules of another software module, enterprise application, or hardware module without departing from the scope of this disclosure.

The computing device 110 includes an interface 504. Although illustrated as a single interface 504 in FIG. 5, two or more interfaces 504 may be used according to particular needs, desires, or particular implementations of the computing device 110. The interface 504 is used by the computing device 110 for communicating with other systems in a distributed environment that are connected to the network 530.

Generally, the interface 504 includes logic encoded in software or hardware (or a combination of software and hardware) and operable to communicate with the network 530. More specifically, the interface 504 may include software supporting one or more communication protocols associated with communications such that the network 530 or interface's hardware is operable to communicate physical signals within and outside of the illustrated computing device 110.

The computing device 110 includes at least one computer processor 505. Although illustrated as a single computer processor 505 in FIG. 5, two or more processors may be used according to particular needs, desires, or particular implementations of the computing device 110. Generally, the computer processor 505 executes instructions and manipulates data to perform the operations of the computing device 110 and any algorithms, methods, functions, processes, flows, and procedures as described in the instant disclosure.

The computing device 110 also includes a non-transitory computing device 110 readable medium, or a memory 506, that holds data for the computing device 110 or other components (or a combination of both) that can be connected to the network 530. For example, memory 506 can be a database storing data consistent with this disclosure. Although illustrated as a single memory 506 in FIG. 5, two or more memories may be used according to particular needs, desires, or particular implementations of the computer 110 and the described functionality. While memory 506 is illustrated as an integral component of the computer 110, in alternative implementations, memory 506 can be external to the computer 110.

The application 507 may be an algorithmic software engine providing functionality according to particular needs, desires, or particular implementations of the computer 110, particularly with respect to functionality described in this disclosure. For example, application 507 can serve as one or more components, modules, applications, etc. Further, although illustrated as a single application 507, the application 507 may be implemented as multiple applications 507 on the computer 110. In addition, although illustrated as integral to the computer 110, in alternative implementations, the application 507 can be external to the computer 110.

There may be any number of computers 110 associated with, or external to, a computer system containing computer 110, each computer 110 communicating over network 530, for example, to carry out a virtual meeting. Further, the term "client," "user," and other appropriate terminology may be used interchangeably as appropriate without departing from the scope of this disclosure. Moreover, this disclosure contemplates that many users may use one computer 110, or that one user may use multiple computers 110.

Throughout the description, including the claims, the term "comprising a" should be understood as being synonymous with "comprising at least one" unless otherwise stated. In addition, any range set forth in the description, including the claims should be understood as including its end value(s) unless otherwise stated. Specific values for described elements should be understood to be within accepted manufacturing or industry tolerances known to one of skill in the art, and any use of the terms "substantially" and/or "approximately" and/or "generally" should be understood to mean falling within such accepted tolerances.

Where any standards of national, international, or other standards body are referenced (e.g., ISO, etc.), such references are intended to refer to the standard as defined by the national or international standards body as of the priority date of the present specification. Any subsequent substantive changes to such standards are not intended to modify the scope and/or definitions of the present disclosure and/or claims.

It is intended that the specification and examples be considered as illustrative only, with a true scope of the disclosure being indicated by the following claims.

While the invention has been described with respect to a limited number of embodiments, those skilled in the art, having benefit of this disclosure, will appreciate that other embodiments can be devised which do not depart from the spirit of the invention as disclosed herein. Accordingly, the scope of the invention should be limited only by the attached claims.

Referring back to FIG. 1, in an embodiment, the system 100 is configured to obtain ambient audio data, using the second sound sensor 108, at a time when the user 103 is not speaking T1. The ambient audio data represents ambient sound surrounding the user 103. The system 100 is further configured to obtain mixed audio data, using the second sound sensor 108, at a time T2 when the user 103 is speaking. The mixed audio data represents ambient sound surrounding the user 103 and the attenuated voice audio that has propagated through the shell 102.

In an embodiment, the time T1when the user 103 is not speaking and the time T2 when the user 103 is speaking are determined using the audio data acquired from the first sound sensor 106. In an embodiment, the audio data acquired by the first sound sensor 106 is compared with at least one threshold level to determine if the user 103 is speaking or not speaking. In an embodiment, the audio data acquired from the first sound sensor 106 is processed before comparison with the at least one threshold value.

In an embodiment, the ambient audio data acquired at T1 is then processed by the computing device 110 to obtain an equivalent level Leq_ambient. In an embodiment, Leq_ambient is an average spectrum of the ambient sound pressure level obtained at T1, wherein the spectrum indicates the frequencies comprised in the ambient audio data and their amplitudes. Leq_ambient may be stored in memory 506.

The mixed audio data acquired at T2 is also processed by the computing device 110 to obtain an equivalent level Leq_mixed. In an embodiment, Leq_mixed is an average spectrum of the ambient sound pressure level obtained at T1, wherein the spectrum indicates the frequencies comprised in the mixed audio data and their amplitudes.

The exit sound pressure level may then be determined, by the computing device 110, based on Leq_mixed and Leq_ambient. In an embodiment, the exit sound pressure level may be determined as the difference between Leq_mixed and Leq_ambient. The exit sound pressure level indicates the emergence of the voice of the user 103 from the shell 102.

A performance coefficient of the shell may be defined as how effective the shell 102 is at attenuating voice audio from the user 103 from exiting the shell 102. The performance coefficient can be determined based on the exit sound pressure level and the sound pressure level of the voice audio determined from the audio data from the first sound sensor 106. In an embodiment, the performance coefficient can be determined based on the difference between the exit sound pressure level and the sound pressure level of the voice audio.

In an embodiment, the performance coefficient can be determined based on the difference between the exit sound pressure level and the sound pressure level of the voice audio, expressed as a percentage of the sound pressure level of the voice audio.

The shell 102 may be associated with a known target shell attenuation factor, wherein the potential attenuation factor is the amount of attenuation of the voice signal achievable by the proper use of the shell 102. A performance coefficient may be obtained by comparing the difference between the exit sound pressure level and the sound pressure level of the voice audio with the target shell attenuation factor. The difference between the exit sound pressure level and the sound pressure level of the voice may be referred to as the working shell attenuation factor. In an embodiment, the performance coefficient may be determined based on if the working shell attenuation factor is substantially the same as the target shell attenuation factor. In an alternative embodiment, the performance coefficient may be determined based on if the working shell attenuation factor is within a given range of the target shell attenuation factor. Other methods of comparing the working shell attenuation factor with the target shell attenuation factor may be used.

The performance coefficient may be provided to a user 103 as an indication (e.g., on a display 210) to enable to user 103 to determine, for example, whether the shell 102 has been properly equipped on the face of the user 103 and/or whether the shell 102 or sound absorber 104 is faulty.

In an embodiment, the maximum desired distance of the attenuated voice audio may be determined based on the exit sound pressure level and the ambient sound pressure level. In an embodiment, in response to determining that the maximum desired distance exceeds the predetermined distance threshold, a notification is provided to the user 103 that the selected confidentiality level of the voice audio cannot be assured.

When the working shell attenuation factor is not substantially the same as the target shell attenuation factor, then increased ambient sound may be measurable by the first sound sensor 106. This will affect the quality of the received voice audio or call. The above method does not give a percentage of the ambient noise into the first sound sensor 106.

In an embodiment, audio data received by the first sound sensor 106 is separated into a first ambient component and a first voice component. In an embodiment, the separation is achieved by filtering the audio data received by the first sound sensor 106. In an embodiment, the filter is a Wiener filter that filters the audio data received by the first sound sensor 106 based on an average of the audio data received by the second sound sensor 108. In an embodiment, the Wiener filter is a 200-order filter. In an embodiment, other separation techniques can be used such as principal component analysis.

In an embodiment, audio data received by the second sound sensor 108 is separated into a second ambient component and a second voice component. In an embodiment, the separation is achieved by filtering the audio data received by the second sound sensor 108. In an embodiment, the filter is a Wiener filter that filters the audio data received by the second sound sensor 106 based on an average of the audio data received by the first sound sensor 108. In an embodiment, the Wiener filter is a 200-order filter. In an embodiment, other separation techniques can be used such as principal component analysis.

In an embodiment, a voice performance coefficient is determined based on the first voice component and the second voice component. In an embodiment, the voice performance coefficient is computed as a difference between the first voice component and the second voice component. The voice performance coefficient will indicate how effective the shell is at attenuating the user's 103 voice.

In an embodiment, an ambient performance coefficient is determined based on the first ambient component and the second ambient component. In an embodiment, an ambient performance coefficient is computed as a difference between the first ambient component and the second ambient component. The ambient performance coefficient will indicate how effective the shell 103 is at attenuating the external ambient noise from the first sound sensor 106 within the shell 103.

In an embodiment, the performance coefficient may be further calculated based on the voice performance coefficient and/or the ambient performance coefficient.

In an embodiment, a voice-to-ambient performance coefficient is determined based on the first voice component and the first ambient component. The voice-to-ambient performance coefficient will indicate if the voice measured by the first sensor 106 is louder than the ambient noise measured by the first sound sensor 106. In an embodiment, the difference between the first voice component and the first ambient noise component is used to determine the voice-to-ambient performance coefficient.

In an embodiment, an indication of the voice-to-ambient performance coefficient is provided to the user 103 via the computing device. In an embodiment, the performance coefficient may be further calculated based on the voice-to-ambient performance coefficient.

In an alternative embodiment, the audio signals measured by the first and second sound sensors 106 and 108 can be cross-correlated to obtain a cross-correlation product. The cross-correlation product is measure of similarity between the signals measured by the first and second sound sensors 106 and 108.

In an embodiment, the performance coefficient is calculated based on the cross-correlation product. In an embodiment, the performance coefficient is calculated based on the comparing the cross-correlation product to at least one threshold.

If a certain amount of signal from 108 is in 106 according to an empirical scale that will mean that the mask is not sealed. On the other hand, if a certain amount of 106 into 108 is measured in real time, that will indicate a potential sound propagation of the voice (103) into the ambient environment.

The invention claimed is:

1. A system for maintaining confidentiality of vocal audio, the system comprising:

a first sound sensor configured to receive voice audio;

a computing device configured to:

receive a selected confidentiality level from a user, the selected confidentiality level having a predetermined distance threshold;

receive the voice audio from the first sound sensor;

obtain a voice sound pressure level of the voice audio;

obtain an ambient sound pressure level associated with ambient sound;

determine a maximum desired distance of the voice audio based on the voice sound pressure level and the ambient sound pressure level; and in response to determining that the maximum desired distance exceeds the predetermined distance threshold, provide a notification to the user that the selected confidentiality level of the voice audio cannot be assured.

2. The system according to claim 1, wherein the computing device is configured to interact wirelessly with the first sound sensor.

3. The system according to claim 1, wherein, in response to determining that the maximum desired distance exceeds the predetermined distance threshold, the computing device is configured to notify other users with whom the user is in communication via the computing device that confidentiality of the voice audio cannot be assured.

4. The system according to claim 1, further comprising an image capture device configured to obtain an image comprising one or more third parties, wherein the computing device is configured to:

determine a zone of perceptibility based on the maximum desired distance; and provide an indication to the user, based on a position for each third party of the one or more third parties, a likelihood of the third party perceiving the voice audio.

5. The system according to claim 4, wherein the indication comprises a color-coded heat map chart.

6. The system according to claim 1, wherein, based on a user selection, the computing device is configured to output a reproduction of the voice audio.

7. The system according to claim 6, wherein the reproduction comprises one or more of an audible reproduction and a visual reproduction.

8. The system according to claim 1, wherein the computing device is configured to provide real-time visual guidance to the user for increasing and decreasing the voice sound pressure level.

9. The system according to claim 1, further comprising a wireless headset configured to reproduce audio received from the computing device and to provide the notification.

10. The system according to claim 1, wherein the computing device comprises one of a mobile telephone, a laptop computer, and a desktop computer.

11. A method for maintaining confidentiality of vocal audio, the method comprising:

receiving a selected confidentiality level from a user, the selected confidentiality level having a predetermined distance threshold;

receiving, by a computing device, voice audio from a first sound sensor;

obtaining a voice sound pressure level of the voice audio;

obtaining an ambient sound pressure level associated with ambient sound;

determining a maximum desired distance of the voice audio based on the voice sound pressure level and the ambient sound pressure level; and in response to determining that the maximum desired distance exceeds the predetermined distance threshold, providing, by the computing device a notification to the user that the selected confidentiality level of the voice audio cannot be assured.

12. The method according to claim 11, further comprising providing real-time visual guidance to the user for increasing and decreasing the voice sound pressure level.

13. The method according to claim 11, further comprising:

obtaining an image comprising one or more third parties in proximity to the user;

determining a zone of perceptibility based on the maximum desired distance; and providing an indication to the user, based on a position for each third party of the one or more third parties, a likelihood of the third party perceiving the voice audio.

14. The system according to claim 1, the computing device further configured to:

obtain ambient audio data at a time when the user is not speaking, the ambient audio data associated with the ambient sound;

obtain mixed audio data at a time when the user is speaking, the mixed audio associated with the ambient sound and the voice audio; and determine an exit sound pressure level based on the ambient audio data and the mixed audio data calculate a performance coefficient based on the voice sound pressure level and the exit sound pressure level.

15. The system according to claim 14, wherein the ambient audio data and the mixed audio data are determined based on the voice audio received by the first sound sensor.

16. The system according to claim 14, wherein determining the exit sound pressure level based on the ambient audio data and the mixed audio data comprises:

determining an ambient sound pressure level based on the ambient audio data;

determining a mixed sound pressure level based on the mixed audio data; and determining the exit sound pressure level based on the ambient sound pressure level and the mixed sound pressure level.

17. The system according to claim 1, the computing device further configured to:

separate the voice data received by the first sound sensor into a first ambient component and a first voice component;

determine a voice performance coefficient based on the first voice component; and determine an ambient performance coefficient based on the first ambient component, wherein a performance coefficient is calculated based on at least one of the voice performance coefficient and the ambient performance coefficient.

18. The system according to claim 17, wherein to separate the voice audio received by the first sound sensor into a first ambient component and a first voice component comprises using a Wiener filter.

19. The system according to claim 17, the computing device further configured to:

determine a voice-to-ambient performance coefficient based on the first voice component and the first ambient component; and provide an indication of the voice-to-ambient performance coefficient via the computing device.

20. The system according to claim 19, wherein the performance coefficient is calculated further based on the voice-to-ambient performance coefficient.

21. The system according to claim 1, the computing device further configured to:

obtain mixed audio data; and calculate a cross-correlation product between the voice data received by the first sound sensor and the mixed audio data;

wherein a performance coefficient is calculated based on the cross-correlation product.

22. The method according to claim 11, the method further comprising:

obtaining ambient audio data at a time when the user is not speaking, the ambient audio data associated with the ambient sound;

obtaining mixed audio data at a time when the user is speaking, the mixed audio associated with the ambient sound and the voice audio;

determining an exit sound pressure level based on the ambient audio data and the mixed audio data; and calculating a performance coefficient based on the voice sound pressure level and the exit sound pressure level.

23. The method according to claim 22, wherein the ambient audio data and the mixed audio data are determined based on the voice audio received by the first sound sensor.

24. The method according to claim 22, wherein determining the exit sound pressure level based on the ambient audio data and the mixed audio data comprises:

determining an ambient sound pressure level based on the ambient audio data;

determining a mixed sound pressure level based on the mixed audio data; and determining the exit sound pressure level based on the ambient sound pressure level and the mixed sound pressure level.

25. The method according to claim 11, further comprising:

separating the voice audio received by the first sound sensor into a first ambient component and a first voice component;

determining a voice performance coefficient based on the first voice component; and determining an ambient performance coefficient based on the first ambient component, wherein a performance coefficient is calculated based on at least one of the voice performance coefficient and the ambient performance coefficient.

26. The method according to claim 25, wherein the separating the audio data received by the first sound sensor into a first ambient component and a first voice component comprises using a Wiener filter.

27. The method according to claim 25, further comprising:

determining a voice-to-ambient performance coefficient based on the first voice component and the first ambient component; and providing an indication of the voice-to-ambient performance coefficient via the computing device.

28. The method according to claim 27, wherein the performance coefficient is calculated further based on the voice-to-ambient performance coefficient.

29. The method according to claim 11, further comprising:

obtaining mixed audio data; and calculating a cross-correlation product between the voice audio received by the first sound sensor and the mixed audio data;

wherein a performance coefficient is calculated based on the cross-correlation product.

* * * * *